US011301760B2

(12) United States Patent
Rakshit et al.

(10) Patent No.: US 11,301,760 B2
(45) Date of Patent: Apr. 12, 2022

(54) AUTOMATED POSTULATION THRESHOLDS IN COMPUTER-BASED QUESTIONING

(71) Applicant: INTERNATIONAL BUSINESS MACHINES CORPORATION, Armonk, NY (US)

(72) Inventors: Sarbajit K. Rakshit, Kolkata (IN); Craig M. Trim, Ventura, CA (US); Victor Povar, Vancouver (CA); Veronica Wyatt, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 553 days.

(21) Appl. No.: 16/202,611

(22) Filed: Nov. 28, 2018

(65) Prior Publication Data

US 2020/0167667 A1 May 28, 2020

(51) Int. Cl.
*G06F 3/048* (2013.01)
*G06N 5/02* (2006.01)
*G06F 16/9535* (2019.01)
*G06F 16/242* (2019.01)
*H04L 67/306* (2022.01)

(52) U.S. Cl.
CPC .......... *G06N 5/022* (2013.01); *G06F 16/243* (2019.01); *G06F 16/9535* (2019.01); *H04L 67/306* (2013.01)

(58) Field of Classification Search
CPC . H04L 67/306; G06F 16/9535; G06F 16/243; G06N 5/022
See application file for complete search history.

(56) References Cited

U.S. PATENT DOCUMENTS

| | | | |
|---|---|---|---|
| 7,830,249 B2 | 11/2010 | Dorneich et al. | |
| 9,911,162 B2 | 3/2018 | Byron et al. | |
| 10,453,453 B2* | 10/2019 | Penilla | B60R 16/0373 |
| 10,514,766 B2* | 12/2019 | Gates | G06F 3/017 |
| 10,796,561 B1* | 10/2020 | Grover | G08B 29/188 |
| 2010/0211439 A1* | 8/2010 | Marci | G06Q 10/10 |
| | | | 705/7.29 |

(Continued)

FOREIGN PATENT DOCUMENTS

WO 2012025622 3/2012

OTHER PUBLICATIONS

Lees, "Candidates and feedback: ask the right questions, get the right answers", https://www.theguardian.com/careers/candidates-constructivefeedback-questions-answers, The Guardian, Jul. 22, 2013, 3 pages.

(Continued)

*Primary Examiner* — Rashawn N Tillery
(74) *Attorney, Agent, or Firm* — Randy Emilio Tejeda; Andrew D. Wright; Roberts Calderon Safran & Cole, P.C.

(57) ABSTRACT

A computer-implemented method includes: retrieving, by a computer device, data related to a person, the data being retrieved from sensors that collect the data; determining, by the computer device, an emotional state of the person based on the data; comparing, by the computer device, question information of a question to the emotional state; and determining, by the computer device, if a particular time is a preferred time to ask the user the question based on the results of the comparing.

20 Claims, 5 Drawing Sheets

(56) References Cited

U.S. PATENT DOCUMENTS

| | | | | |
|---|---|---|---|---|
| 2012/0324493 | A1* | 12/2012 | Holmdahl | H04N 21/42202 725/12 |
| 2014/0052681 | A1* | 2/2014 | Nitz | H04L 51/02 706/46 |
| 2014/0223462 | A1* | 8/2014 | Aimone | G16H 40/67 725/10 |
| 2016/0259908 | A1 | 9/2016 | Hong et al. | |
| 2017/0353840 | A1 | 12/2017 | Bostick et al. | |
| 2019/0132646 | A1* | 5/2019 | Bharti | H04N 21/84 |
| 2020/0160399 | A1* | 5/2020 | Rakshit | G06K 9/00664 |

OTHER PUBLICATIONS

Hawley, "Getting the Right Stakeholder Feedback at the Right Time", http://www.uxmatters.com/mt/archives/2011/07/getting-the-rightstakeholder-feedback-at-the-right-time.php, Jul. 4, 2011, 5 pages.

Halford, "5 Steps for Giving Productive Feedback", https://www.entrepreneur.com/article/219437, accessed Oct. 9, 2018, 2 pages.

Ciotti, "8 ways to collect customer feedback", https://www.helpscout.net/blog/customer-feedback/, Feb. 14, 2018, 9 pages.

Mell et al., "The NIST Definition of Cloud Computing", NIST, Special Publication 800-145, Sep. 2011, 7 pages.

\* cited by examiner

US 11,301,760 B2

AUTOMATED POSTULATION THRESHOLDS IN COMPUTER-BASED QUESTIONING

BACKGROUND

The present invention relates generally to computer based questioning systems using biometric sensors and, more particularly, to optimizing the timing of asking a person a question based on a condition of the person.

A question can provoke a different answer depending on the mood or other situation of the person being asked the question. In many situations, a desired or more accurate answer can be received if the question is asked at a time when the person being asked the question is, or is not, in a certain frame of mind or is, or is not, in a particular situation.

SUMMARY

In a first aspect of the invention, there is a computer-implemented method including retrieving, by a computer device, biometric data of a person, the biometric data being retrieved from sensors that collect the biometric data from the person; determining, by the computer device, an emotional state of the person based on the biometric data; comparing, by the computer device, question information of a question to the emotional state; and determining, by the computer device, if a particular time is a preferred time to ask the user the question based on the results of the comparing.

In another aspect of the invention, there is a computer program product including a computer readable storage medium having program instructions embodied therewith. The program instructions are executable by a computing device to cause the computing device to retrieve biometric data of a person, the biometric data being retrieved from sensors that collect the biometric data from the person; determine an emotional state of the person based on the biometric data; compare question information of a question to the emotional state; and determine if a particular time is a preferred time to ask the person the question based on the results of the comparing.

In another aspect of the invention, there is system including a processor, a computer readable memory, and a computer readable storage medium. The system includes program instructions to retrieve biometric data of a person, the biometric data being retrieved from sensors that collect the biometric data from the person; program instructions to determine an emotional state of the person based on the biometric data; program instructions to compare question information of a question to the emotional state; and program instructions to determine if a particular time is a preferred time to ask the person the question based on the results of the comparing. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
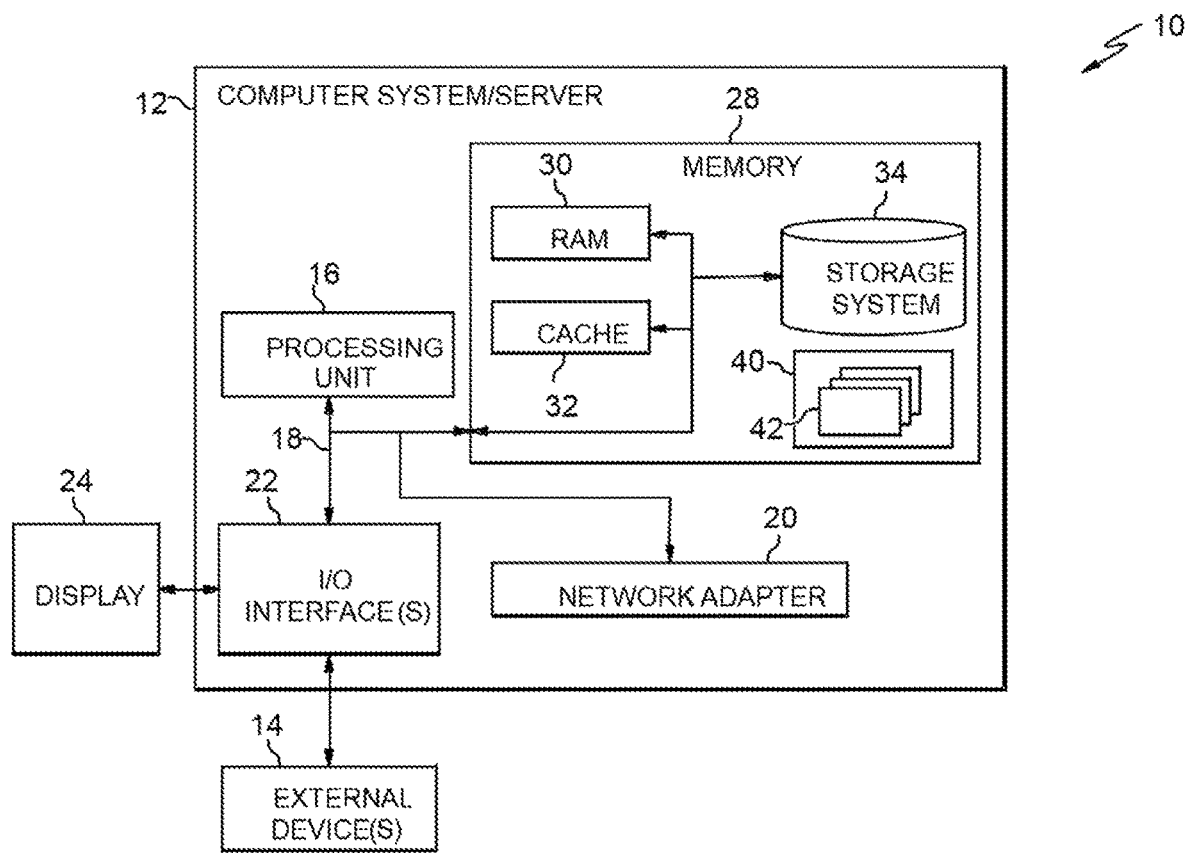
FIG. 1 depicts a cloud computing node according to an embodiment of the present invention.

The present invention relates generally to computer based questioning systems using biometric sensors and, more particularly, to optimizing the timing of asking a person a question based on a condition of the person. According to aspects of the invention, biometric data of a person is used to determine the optimal time to ask the person a question. Sensors such as, for example, those in a smart watch or other wearable device obtain biometric data of the person. A computer device retrieves the biometric data and determines therefrom emotional state of the person. The computer device compares particular information about the question to be asked to the emotional state of the person and then determines, based on that comparison, if a particular time is a preferred time to ask the person the question. In embodiments, the computer device establishes a preferred answer to the question and bases the determination of whether the particular time is a preferred time at least partially on the preferred answer. In this manner, implementations of the invention improve the value of an answer received from a person being asked a question.

Implementations of the invention improve the performance of a computer system that asks a person a question by considering electronically sensed biometric data of the person when determining when to ask the person the question. Embodiments of the invention increase the likelihood of receiving desired answers by retrieving the electronically sensed biometric data of the person and processing the biometric data to determine if the person is in the desired state of mind. Embodiments of the invention generate a profile of the person that includes a pattern of behavior based on the biometric data and other information and then use the profile to determine if the person is in the desired state of mind. Embodiments of the invention employ an unconventional arrangement of steps including: generating a profile of the person based on sensed biometric data and previous responses concurrent with the sensed biometric data; determining an emotional state of the person based on sensed biometric data and an activity being performed by the person; comparing question information of a question to the current emotional state and the profile; and determining if a particular time is a preferred time to ask the user the question based on the results of the comparing. The steps themselves are unconventional, and the combination of the steps is also unconventional. For example, the steps of generating a profile of the person based on the biometric data and responses to questions asked concurrently with the biometric data, and comparing question information to the current emotional state and the profile create new information that does not exist in the system, and this new information is then used in subsequent steps in an unconventional manner.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
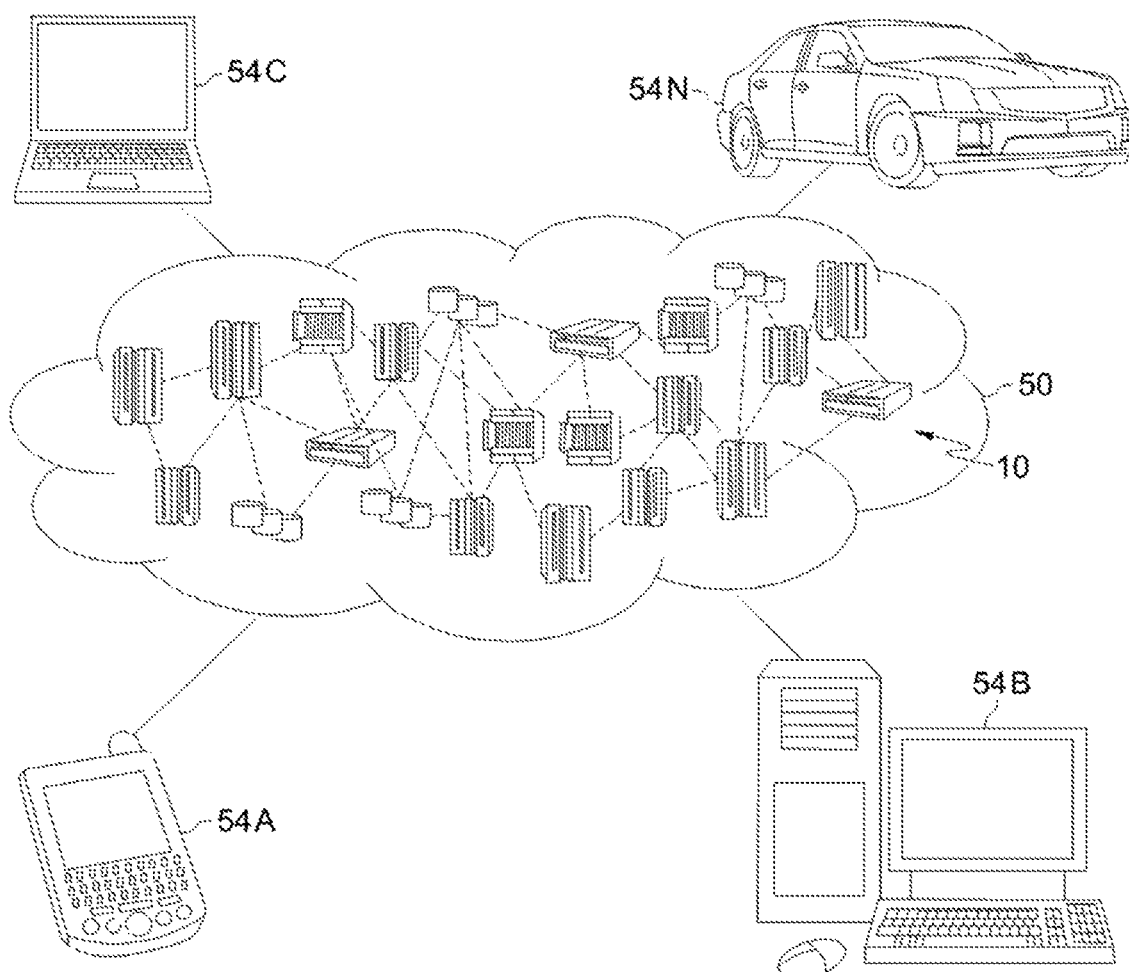
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
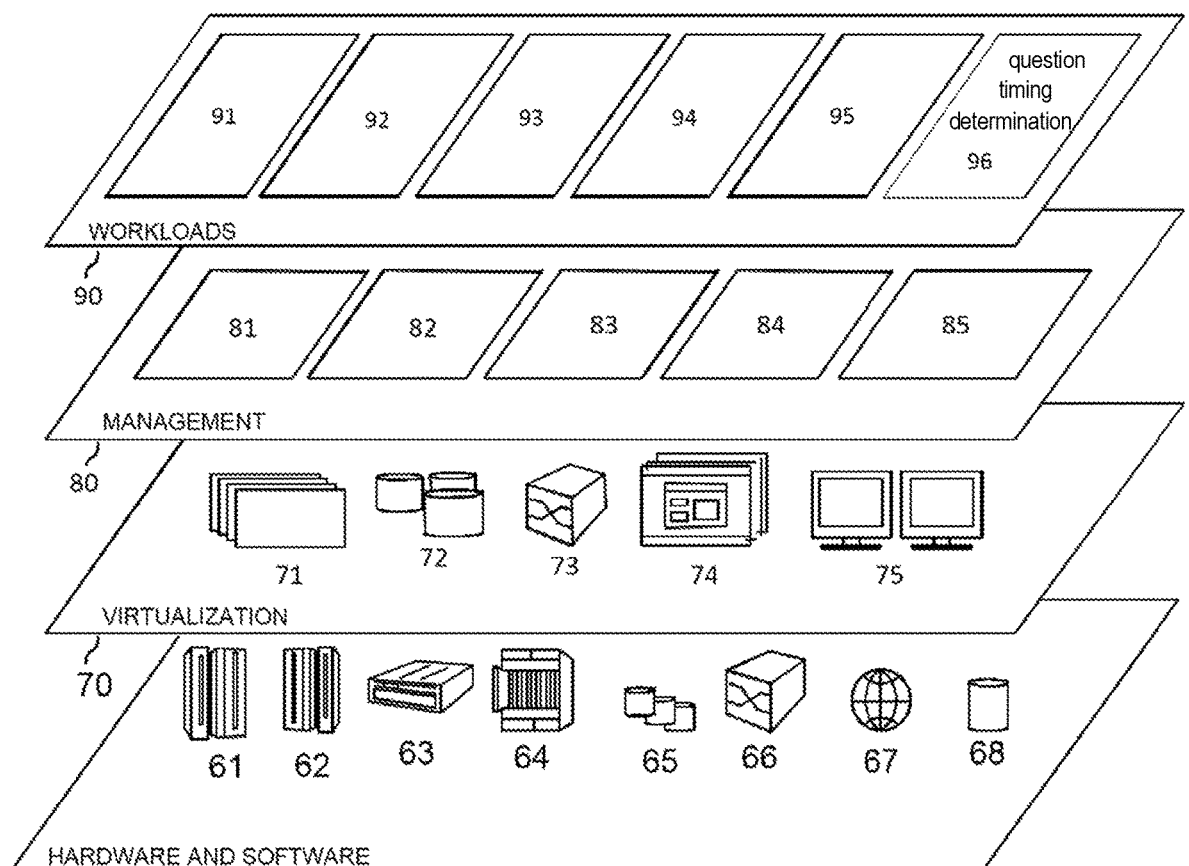
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and question timing determination 96.

Implementations of the invention may include a computer system/server 12 of FIG. 1 in which one or more of the program modules 42 are configured to perform (or cause the computer system/server 12 to perform) one or more functions of the question timing determination 96 of FIG. 3. For example, the one or more of the program modules 42 may be configured to: retrieve biometric data of a person, the biometric data being retrieved from sensors that collect the biometric data from the person; determine an emotional state of the person based on the biometric data; compare question information of a question to the emotional state; and determine if a particular time is a preferred time to ask the person the question based on the results of the comparing.

In certain circumstances, it can be difficult to know when the best time is to ask a question for which a certain answer is desired. The time at which the question is asked can be a factor in what answer is received. If we ask a person a question when the person is in a bad mood, or rushed, or has other things distracting them, the answer may not be the desired answer. Many people work or live in remote areas and do not have the opportunity to be face-to-face with a person when they ask that person a question. A sales representative benefits from embodiments of the invention by learning when to place the next call to a particular customer or when to make a cold call to a potential customer. In other cases, finding a preferred time to ask a question involves finding the time when a negative answer is more likely. In these situations, the asker of the question might want to find a time when the recipient of the question is not in the right frame of mind to give a positive answer.

Embodiments of the invention leverage the biometric data that indicates what emotional state a person is in and determine a preferred time to ask that person a question based on his or her state of mind. Embodiments of the invention can be used by the person being asked questions to determine if they are in a preferred state of mind to answer questions and/or interact with other people under certain social conditions. For example, some people have a preferred time for interacting in the morning while other people have a preferred time for interacting in the early afternoon. Embodiments of the invention are useful in dividing the day into useful segments where energy is invested in the most efficient manner possible. Embodiments of the invention are not limited to human-to-human interactions. In embodiments, internet bots are controlled and optimized by avoiding less than ideal and/or inconvenient times and situations. Embodiments of the invention improve application programming interfaces by determining preferred times to run associated bots.

Embodiments of the invention include methods and systems by which: (1) software installed in a person's devices predicts, using cognitive learning, the best possible timing to ask any question/feedback, so that the person provides unbiased answers to any question or feedback, and in some embodiments a voice-based system installed in the person's device asks the questions; (2) based on current health condition, mental state, emotional state, surrounding context and cognitive state of the person, software predicts appropriate and/or preferred timing for the person to answer the questions or provide feedback, and in some embodiments, a voice-enabled system asks the questions to the person; (3) software, using a self-learning method, classifies the questions or required feedback where various cognitive state, un-biasness, surrounding contexts, and health condition are important (if any question or feedback is identified and the person's response is necessary, then the mobile (or other) device stores the question and searches for suitable timing for asking the question); (4) software predicts various questions and asks the questions during any suitable time using contextual analysis of spoken contents, read out contents, the person's performed activities, etc., and after the answer is provided, the cognitive system asks for permission to share the answer/feedback with appropriate concern parties.

It should be understood that, to the extent implementations of the invention collect, store, or employ personal information provided by, or obtained from, individuals (for example, computer device 400), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 4:
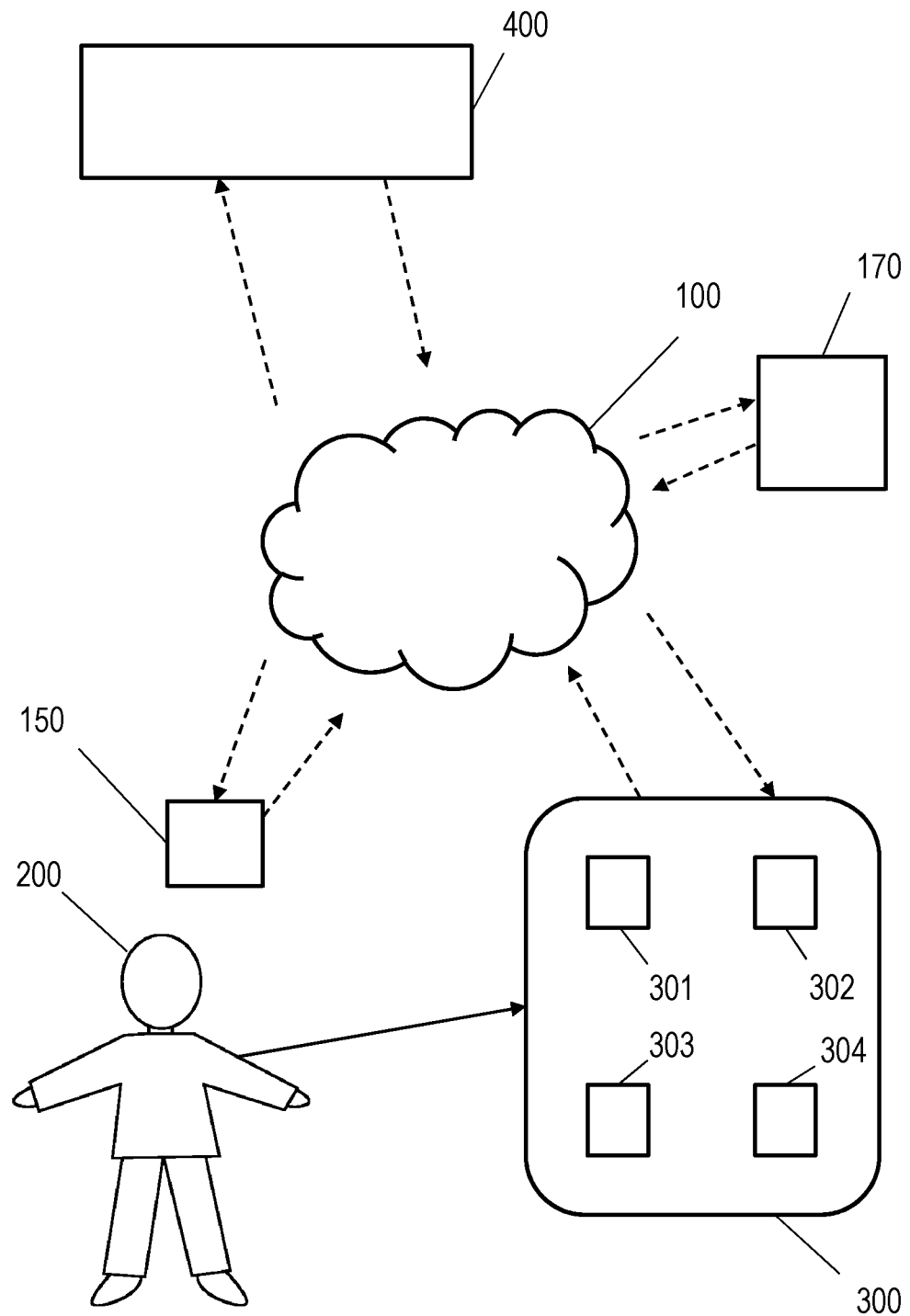
FIG. 4 shows a block diagram of an exemplary environment in accordance with aspects of the invention.

FIG. 4 shows a block diagram of an exemplary environment in accordance with aspects of the invention. In embodiments, the environment includes a network (e.g., a LAN, a WAN, and the Internet), for example a cloud network 100, over which various other elements of the environment communicate with each other. In this embodiment, a computer device 400 contains one or more of the components of computer system/server 12 (shown in FIG. 1) and communicates with various other elements of the environment through network 100 to form a cognitive system. In embodiments, a person 200 wears a wearable device 300 that includes one or more sensors 301, 302, 303, 304 that sense biological parameters of the person 200. In embodiments, wearable device 300 is a smart watch or other smart device worn on the wrist or other part of the person 200. In embodiments, one or more of the sensors 301, 302, 303, 304 are part of one or more devices that are sufficiently close to the person 200 that the biological parameters of the person 200 are sensed by one or more of the sensors 301, 302, 303, 304. In embodiments, one or more of the sensors 301, 302, 303, 304, or other sensors or devices collect information such as weather, temperature, time of day, or any other information or condition that effects the person 200, in particular information or conditions that effect the emotional state of the person 200. Examples of biological parameters that are sensed by the sensors 301, 302, 303, 304 include, but are not limited to, heart rate, skin temperature, blood pressure, hand movement, and overall body movement.

In embodiments, the computer device 400 gathers social network data 170 that is viewed or otherwise accessed by the person 200. In embodiments, the computer device 400 associates the social network data 170 viewed or otherwise accessed by with the person 200 by knowing the Internet protocol addresses of various network interfaces 150 owned or used by the person 200. Examples of the network interfaces 150 include, but are not limited to, computers, tablets, phones, televisions, radios, appliances, and other devices that access the Internet. In embodiments, the information and data viewed or otherwise accessed by the person 200 is used to determine the emotional state of the person 200. For example, when the person 200 is watching a comedy show on television the computing device 400 considers that information as indicating that the person 200 is in a happy emotional state of the person 200. In this example, embodiments consider the watching of the comedy show in conjunction with the other types of information discussed herein to determine the emotional state of the person 200. If some information suggests a happy emotional state (such as the watching of the comedy show) but other information suggests an angry emotional state (such as a high heart rate and elevated skin temperature), the computer device 400 weighs the conflicting information and makes a determination as to the emotional state based on profile of the person 200.

In embodiments, tone analysis and/or emotive analysis are used on responses by the person 200 to determine the emotional state of the person 200 in the particular situation or during the particular activity. For example, these analyses are performed on responses by the person 200 and tied to the social network data 170 and/or the information from the various network interfaces 150 that is being viewed or otherwise accessed by the person 200 at that time.

In embodiments, computer device 400 includes a processing unit, such as processing unit 16, that performs contextual analysis to identify various information about the user by analyzing spoken contents, read out content, viewed content, and activities and identifies possible questions that should be asked of the person 200 to get feedback. Accordingly, the computer device 400 monitors the sensors 301, 302, 303, 304 and the network interfaces 150 and, based on information received from these sources, determines a preferred time to ask the person 200 a question. After the answer or feedback is provided, in embodiments, the computer device 400 requests permission for sharing the answer with entities other than the person 200. The answers/feedback obtained from the person 200 are stored by the computer device 400 and become part of a database of information associated with the person 200 that is used in a self-learning process that tailors the timing and/or content of future questions. In embodiments, a non-answer or the length of the answer by the person 200 to the question is a part of the self-learning process of computer 400. For example, in embodiments, a very short answer is taken as an indication that person 200 is not in the best frame of mind to accurately answer the question.

In embodiments, a smartwatch or other wearable device 300 of the person 200, and in some embodiments other persons near or associated with the person 200, gathers the biometric data and associates the biometric data with various activities the person 200 is performing. In embodiments, multiple device feeds indicate a pattern of body movement and, in conjunction with hand movement software, identifies what activities the person 200 is performing such as, for example, eating, playing, reading a newspaper, working with a mobile device, exercising, socializing, etc. In embodiments, software running on computer device 400 creates a pattern of activities performed by person 200, timing of the activities, contextual location of the activities, and associated mental, emotional, or health conditions of person 200 during the activities.

In embodiments, the computer device 400 associates the social network data 170 and/or information from the various network interfaces 150 (when available) with the current activity to predict the emotional condition of the person 200.

In embodiments, the computer device 400 identifies biases of the person 200 based on various feedback on social network sites and with comparative analysis with other different types of feedback. For example, the content of social network sites routinely visited by the person 200 and/or comments left by the person 200 on social network sites are an indication of biases of the person 200.

In embodiments, the computer device 400 identifies if the person 200 is available to answer a question or to participate in a question and answer session based on the computer device 400 predicting the current activity of the person 200. In embodiments, various devices of the person 200 or surrounding devices (such as, for example, smart appliances, voice-controlled intelligent personal assistants, security cameras, etc.) identify if the current activity of the person 200 involves a service and, if so, predicts if the person 200's feedback might improve the service or activity.

In embodiments, the computer device 400 identifies appropriate feedback questions which fit the persona, demographic information, or other characteristics of the person 200. The identified feedback questions are prepared for the user and appropriate timing is identified based on the input and analysis discussed above, and then computer device 400 asks the questions. In embodiments, the computer device 400 monitors real-time suitability of asking a question and accordingly changes dynamically the selection of questions.

All or some of the above information is used to build a profile, that, in some embodiments, includes a pattern of behavior, of the person 200 that is used to determine if a particular time is a preferred time to ask the person 200 a question. In embodiments, the profile includes a pattern of behavior that includes prior responses to prior questions and the biometric data and/or activity concurrent with the prior responses. For example, the profile is used to determine that after lunch is a good time to ask the person 200 a question, but first thing in the morning is not a good time. The above interactions, data, and information is used for self-learning of the cognitive system.

In embodiments, some users of the cognitive system/computer device 400 (those entities that ask the questions) are interested in all responses to the questions, good and bad. Other users of the cognitive system/computer device 400 are only interested in collecting positive responses to the questions in order to, for example, provide positive survey results for marketing use. Embodiments of the invention improve results in this situation, and other situations, by determining a preferred time to ask questions or conduct a survey based on biometric and other information to elicit the preferred answer.

In embodiments, a method for producing comprehensible subtitles and captions for an effective group consequence includes: monitoring a person to gather historical trends of the person based on biometric data, body movement, and video tracking to determine when the person generally performs specific activities (e.g., eating, reading, working, answering emails, talking on the phone with clients, etc.); identifying the mental and/or emotional state of the person during the tracked times based on social network data, biometric data, responses, etc.; determining if any of the sources of data have a potential bias for the information tracked and recorded and adjusting the weight of reliance on the data; identifying real-time activities of the person and predicted activities and mental and/or emotional state of the person to determine if the person would be available for a question; and in response to determining that the person is available for a question, proposing a question to the person.

In embodiments, proposing a question to the person includes creating a question specific for the person based on the identified real-time actives of the person and the predicted emotional state of the person.

In embodiments, the computer device 400 performs all or part of the data analysis and prediction discussed in this disclosure. In embodiments, some of the data analysis and prediction is performed by the wearable device 300.

Figure 5:
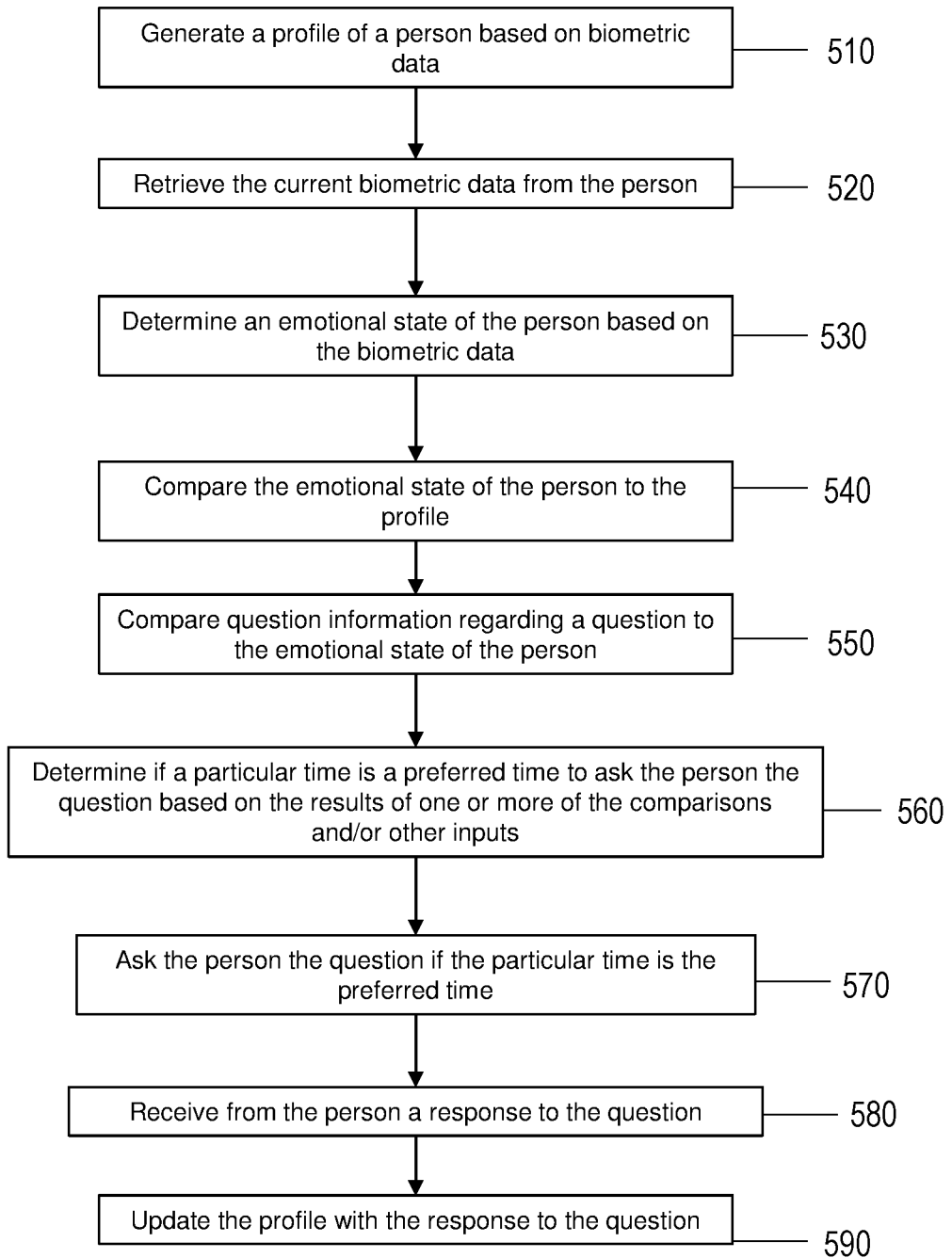
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 510, the computer device 400 develops a profile, including a pattern of behavior, of a person 200 based on biometric data and/or other information such as that obtained from network interfaces 150.

At step 520, the computer device 400 retrieves current biometric data from the person 200. In embodiments the biometric data is collected by the sensors 301, 302, 303, 304 of the wearable device 300 and/or other devices.

At step 530, the computer device 400 determines an emotional state of the person 200 based on the biometric data. In embodiments, other information such as from social media and other information obtained from network interfaces 150 is also used by the computer device 400 to determine the emotional state of the person 200. At step 540, the computer device 400 compares the emotional state of the person 200 to the pattern of behavior. At step 550, the computer device 400 compares question information regarding a question to the emotional state of the person 200. In embodiments, the question information includes the subject of the question, the desired answer (if any), a target group of people to which the question should be directed, and any other information that influences the decision as to whether a particular person should be asked the question.

At step 560, the computer device 400 determines if a particular time is a preferred time to ask the person 200 the question based on the results of one or more of the comparisons and/or other inputs. In embodiments, it is determined that it is the preferred time if the emotional state of the person 200 is within a portion of the pattern of behavior that leads to a desired result/answer.

At step 570, the computer device 400 asks the person 200 the question if the particular time is the preferred time. At step 580, the computer device 400 receives from the person 200 a response to the question. In embodiments, the response is an answer to the question or a non-answer. At step 590, the computer device 400 updates the pattern of behavior with the response to the question.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   retrieving, by a computer device, data of a person, the data being retrieved from sensors that collect the data;
   retrieving, by a computer device, activity data of a person, the activity data being retrieved from at least one network interface that collects the activity data;
   determining, by the computer device, an emotional state of the person based on the activity data, wherein an activity is associated with a predefined emotional state by the computer device;
   comparing, by the computer device, question information of a question to the emotional state;
   determining, by the computer device, a preferred time to ask the person the question based on the results of the comparing, wherein the preferred time is a future time based on a preferred answer to the question, the emotional state, and a pattern of behavior of the person stored in a user profile,
   wherein the activity data includes an identifier of video information being viewed by the person as collected by the at least one network interface, and wherein the video identifier is associated with the predefined emotional state;
   providing an indication of whether the person is available to answer the question at the preferred time.

2. The computer-implemented method of claim 1, further comprising:
   generating, by the computer device, the user profile of the person based on the data and responses to questions asked concurrently with the data; and
   comparing, by the computer device, the emotional state and the user profile,
   wherein the determining if the particular time is the preferred time is also based on the results of the comparing of the emotional state and the user profile.

3. The computer-implemented method of claim 2, wherein the the pattern of behavior of the person includes time of day information associated with a past emotional state.

4. The computer-implemented method of claim 3, further comprising:
   asking, by the computer device, the person the question after the determining if the preferred time results in a determination that it is the future time; and
   receiving, by the computer device, a response to the question from the person,
   wherein the pattern of behavior includes (i) prior responses to prior questions, and (ii) the data concurrent with the prior responses.

5. The computer-implemented method of claim 2, further comprising:
   asking, by the computer device, the person the question after the determining if the preferred time results in a determination that it is the future time;
   receiving, by the computer device, a response to the question from the person; and
   updating, by the computer device, the user profile with the response.

6. The computer-implemented method of claim 1, wherein the determining the preferred time is also based on time of day.

7. The computer-implemented method of claim 1, wherein the determining the preferred time is also based on day of the week.

8. The computer-implemented method of claim 1, further comprising:
gathering, by the computer device, social network data related to the person,
wherein the determining the preferred time is also based on the social network data.

9. The computer-implemented method of claim 8, wherein the social network data includes content being viewed by the person at a particular time.

10. The computer-implemented method of claim 1, further comprising:
responsive to a determination that the future time is now a current time, asking, by the computer device, the person the question; and
receiving, by the computer device, a response to the question from the person.

11. A computer program product, the computer program product comprising a computer readable storage medium having program instructions embodied therewith, the program instructions executable by a computing device to cause the computing device to:
retrieve data of a person, the data being retrieved from sensors and at least one network interface that collect the data, wherein the data of the person includes biometric data of the person and activity data of the person;
identify by the computing device a predefined emotional state associated with the activity data of the person;
determine a first expected emotional state associated with the biometric data of the person, the first expected emotional state having an assigned first weight;
determine a second expected emotional state based on the predefined emotional state associated with the activity data of the person, the second expected emotional state having an assigned second weight;
compare the first and second expected emotional states to determine an emotional state, wherein if the first and second expected emotional states conflict, compute the emotional state using the assigned first and second weights associated with the first and second expected emotional states and a profile of the person;
compare question information of a question to the emotional state;
determine if a particular time is a preferred time to ask the person the question based on the results of the comparing; and
provide an indication of whether the person is available to answer the question corresponding to the question information based at least on the emotional state of the person.

12. The computer program product of claim 11, the program instructions further causing the computer device to:
generate the profile of the person based on the data and responses to questions asked concurrently with the data; and
compare the emotional state and the profile,
wherein the determination of whether the particular time is the preferred time is also based on the results of the comparison of the emotional state and the profile.

13. The computer program product of claim 12, the program instructions further causing the computer device to:
ask the person the question after the determination of whether the particular time is the preferred time indicates that it is the preferred time;
receive a response to the question from the person; and
update the profile with the response.

14. The computer program product of claim 11, the program instructions further causing the computer device to:
gather social network data related to the person,
wherein the determination of whether the particular time is the preferred time is also based on the social network data.

15. A system comprising:
a processor, a computer readable memory, and a computer readable storage medium;
program instructions to retrieve data of a person, the data being retrieved from sensors and at least one network interface that collect the data, wherein the data of the person includes biometric data of the person and activity data of the person;
program instructions to identify by the computing device a predefined emotional state associated with the activity data of the person;
program instructions to determine a first expected emotional state associated with the biometric data of the person, the first expected emotional state having an assigned first weight;
program instructions to determine a second expected emotional state based on the predefined emotional state associated with the activity data of the person, the second expected emotional state having an assigned second weight;
program instructions to compare the first and second expected emotional states to determine an emotional state, wherein if the first and second expected emotional states conflict, compute the emotional state using the assigned first and second weights associated with the first and second expected emotional states and a profile of the person;
program instructions to compare question information of a question to the emotional state;
program instructions to determine a preferred time to ask the person the question based on the results of the comparing, wherein the preferred time is a future time based on a preferred answer to the question, the emotional state, and a pattern of behavior of the person stored in the profile; and
program instructions to provide an indication of whether the person is available to answer the question corresponding to the question information based at least on the emotional state of the person and the preferred time,
wherein
the program instructions are stored on the computer readable storage medium for execution by the processor via the computer readable memory.

16. The system of claim 15, further comprising:
program instructions to generate the profile of the person based on the data and responses to questions asked concurrently with the data;
program instructions to compare the emotional state and the profile,
program instructions to ask the person the question after the determination of whether it is the preferred time;
program instructions to receive a response to the question from the person; and
program instructions to update the profile with the response,
wherein the determination of the preferred time is also based on the results of the comparison of the emotional state and the profile.

17. The system of claim 16, wherein the profile includes a pattern of behavior of the person, and wherein the pattern of behavior includes (i) prior responses to prior questions, and (ii) the data concurrent with the prior responses.

18. The computer-implemented method of claim 1, wherein the video information is being viewed by the person concurrently with the determining of the emotional state of the person.

19. The computer program product of claim 11, wherein the activity data of the person includes a type of television show being watched by the person concurrently with the determining of the emotional state of the person.

20. The system as recited in claim 15, wherein the activity data of the person includes a type of television show being watched by the person, wherein the type of television show corresponds to the predefined emotional state associated with the activity data of the person.

* * * * *